(12) United States Patent  
Greenberger et al.

(10) Patent No.: US 10,769,608 B2  
(45) Date of Patent: Sep. 8, 2020

(54) INTELLIGENT CHECKOUT MANAGEMENT SYSTEM

(71) Applicant: INTERNATIONAL BUSINESS MACHINES CORPORATION, Armonk, NY (US)

(72) Inventors: Jeremy A. Greenberger, Raleigh, NC (US); Zachary M. Greenberger, Raleigh, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 608 days.

(21) Appl. No.: 15/266,294

(22) Filed: Sep. 15, 2016

(65) Prior Publication Data

US 2018/0075427 A1  Mar. 15, 2018

(51) Int. Cl.
| | |
|---|---|
| G06Q 20/20 | (2012.01) |
| G07G 1/00 | (2006.01) |
| G06Q 30/06 | (2012.01) |
| G06Q 10/04 | (2012.01) |
| G06Q 20/38 | (2012.01) |
| G06Q 10/06 | (2012.01) |

(52) U.S. Cl.
CPC .......... *G06Q 20/202* (2013.01); *G06Q 10/04* (2013.01); *G06Q 10/063* (2013.01); *G06Q 20/209* (2013.01); *G06Q 20/389* (2013.01); *G06Q 30/06* (2013.01); *G07G 1/0009* (2013.01)

(58) Field of Classification Search
CPC ... G06Q 20/202; G06Q 20/209; H04L 67/306  
See application file for complete search history.

(56) References Cited

U.S. PATENT DOCUMENTS

| | | | | |
|---|---|---|---|---|
| 5,390,107 A | | 2/1995 | Nelson et al. | |
| 5,465,115 A | * | 11/1995 | Conrad ............. | G06K 9/00778 348/155 |
| 5,581,625 A | * | 12/1996 | Connell ............ | G06K 9/00778 382/100 |
| 5,953,055 A | * | 9/1999 | Huang ............... | G06K 9/00228 348/149 |
| 7,660,747 B2 | | 2/2010 | Brice et al. | |
| 2004/0059614 A1 | * | 3/2004 | Brown .............. | G06Q 30/0281 705/346 |

(Continued)

OTHER PUBLICATIONS

Anonymous Inventors; Ttl: Method to Predict the Shortest Wait Time for a Checkout Lane; Oct. 10, 2012; Database: ip.com; ip.com No. IPCOM000222465D, 3 pgs.

(Continued)

*Primary Examiner* — Ramsey Refai  
(74) *Attorney, Agent, or Firm* — Stephanie Carusillo, Esq.; George S. Blasiak, Esq.; Heslin Rothenberg Farley & Mesiti P.C.

(57) ABSTRACT

Methods, computer program products, and systems are presented. The methods include, for instance: generating a store status based on shopper data and shopping cart for each shopper in a store, and generating a new checkout configuration based on the store status if a current checkout configuration is not optimal according to a checkout operation rule and collected data such that the store checkout configuration would be optimal pursuant to the store status.

16 Claims, 5 Drawing Sheets

(56) References Cited

U.S. PATENT DOCUMENTS

| | | | |
|---|---|---|---|
| 2004/0059634 A1 | 3/2004 | Tami et al. | |
| 2007/0143188 A1* | 6/2007 | Kelley | G06Q 20/20 |
| | | | 705/26.1 |
| 2007/0235531 A1* | 10/2007 | Addison | A47F 9/04 |
| | | | 235/383 |
| 2009/0140046 A1* | 6/2009 | Landers, Jr. | G06Q 10/087 |
| | | | 235/385 |
| 2014/0201041 A1 | 7/2014 | Meyer | |
| 2014/0236653 A1 | 8/2014 | Farrell | |
| 2015/0127496 A1* | 5/2015 | Marathe | G06Q 10/087 |
| | | | 705/28 |
| 2015/0149254 A1* | 5/2015 | Sakamoto | G06Q 30/0201 |
| | | | 705/7.34 |
| 2015/0310312 A1* | 10/2015 | Mongeon | G06K 9/00778 |
| | | | 382/159 |
| 2016/0034981 A1 | 2/2016 | Kluver et al. | |
| 2016/0125483 A1 | 5/2016 | Eramian | |
| 2016/0321548 A1* | 11/2016 | Ziskind | G06N 5/04 |
| 2017/0032304 A1* | 2/2017 | Charpentier | G06Q 10/06316 |
| 2017/0070524 A1* | 3/2017 | Bailey | H04L 63/1416 |
| 2017/0083887 A1* | 3/2017 | Volta | G06Q 20/18 |
| 2018/0097905 A1* | 4/2018 | Todasco | H04L 67/2842 |

OTHER PUBLICATIONS

Mell, Peter, et al., "The NIST Definition of Cloud Computing", NIST Special Publication 800-145, Sep. 2011, Gaithersburg, MD, 7 pgs.

Hurst, Bernice, "Speedy Checkout Wins Retail Technology of the Year", [retrieved on Sep. 1, 2016]. Retrieved from the Internet< URL: http://www.retailcustomerexperience.com/articles/speedy-checkout-wins-retail-technology-of-the-year/>, Apr. 24, 2014, 3 pgs.

Coolridge, Alexander, "New technology helps Kroger speed up checkout times", [retrieved on Sep. 1, 2016]. Retrieved from the Internet< URL: http://www.usatoday.com/story/money/business/2013/06/20/new-technology-helps-kroger-speed-up-checkout-times/2443975/>, The Cincinnati Enquirer, Jun. 20, 2013, 2 pgs.

Anonymous, "Is Kroger's "vision" too nearsighted?", [retrieved on Sep. 1, 2016]. Retrieved from the Internet< URL: http://onekroger.org/2013/10/07/is-krogers-vision-too-nearsighted/>, Oct. 7, 2013, 1 pg.

Ryan, Tom, "Walmart makes 'The Checkout Promise'", [retrieved on Sep. 1, 2016]. Retrieved from the Internet< URL: http://www.retailwire.com/discussion/walmart-makes-the-checkout-promise/>, Aug. 20, 2014, 9 pgs.

Pasricha, Neil, Blogpost #953 "When cashiers open up new checkout lanes at the grocery store", [retrieved on Sep. 1, 2016]. Retrieved from the Internet< URL: http://1000awesomethings.com/2008/08/26/953-when-cashiers-open-up-new-check-out-lanes-at-the-grocery-store/>, Aug. 26, 2008, 19 pgs.

Higginbotham, Stacey, "Grocery shopping might be less painful with this smart cart", [retrieved on Sep. 1, 2016]. Retrieved from the Internet< URL: https://gigaom.com/2015/02/11/grocery-shopping-might-be-less-painful-with-this-smart-cart/>, Feb. 11, 2015, 4 pgs.

Hong, Eliane, "Upgrading the Shopping Experience with a Smart Trolley," [retrieved on Sep. 1, 2016]. Retrieved from the Internet: < URL: http://www.atelier.net/en/trends/articles/upgrading-shopping-experience-smart-trolley_429474>, May 21, 2014, 3 pgs.

* cited by examiner

INTELLIGENT CHECKOUT MANAGEMENT SYSTEM

TECHNICAL FIELD

The present disclosure relates to automated store management, and more particularly to methods, computer program products, and systems for managing checkout lane configuration to efficiently service shoppers based on real-time data as well as stored records.

BACKGROUND

Conventionally, checkout lanes in a store are staffed by a store manager based mainly on visual cues once shoppers begin standing in line to be serviced. As retail markets are very competitive, the shoppers may easily move on to another store once they experience any kind of inconvenience with their shopping, and a long wait at a checkout register may be one of the biggest reason not to return to the store.

SUMMARY

The shortcomings of the prior art are overcome, and additional advantages are provided, through the provision, in one aspect, of a method. The method for optimizing checkout operation includes, for example: obtaining, by one or more processor of a computer, shopper data and shopping cart data associated with each of at least one shopper in a store; generating a current store status by use of the shopper data and the shopping cart data from the obtaining; determining that a current checkout configuration is not optimal according to a checkout operation rule, based on the store status data, a shopper profile respective to each of the at least one shopper, and one or more store transaction records; creating a new checkout configuration by optimizing the current checkout configuration according to the checkout operation rule, by use of the store status data, each of the shopper profile, and the store transaction records; and communicating the new checkout configuration to one or more user at the store in order to deploy the new checkout configuration.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
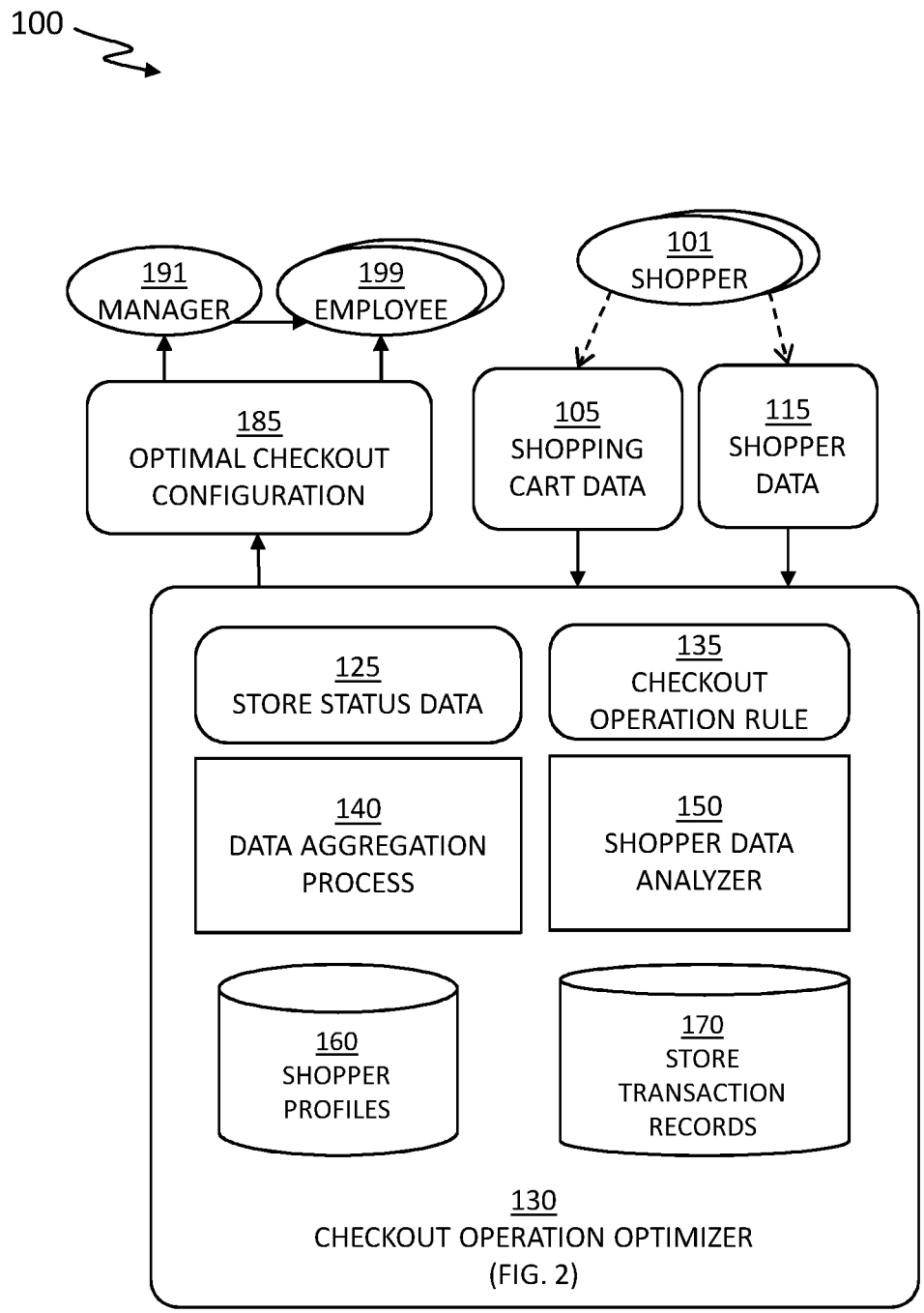
FIG. 1 depicts a system for intelligent checkout management, in accordance with one or more embodiments set forth herein.

FIG. 1 depicts a system 100 for intelligent checkout management, in accordance with one or more embodiments set forth herein.

The system 100 includes a checkout operation optimizer 130, which receives inputs of shopping cart data 105 and shopper data 115, as originated from one or more shoppers 101, by use of various monitoring devices in a store. Examples of the monitoring devices in the store may include, but not limited to, video cameras and image recognition/tracking of shoppers and products in respective shopping carts, radio frequency identification (RFID) tags and scanners, and various micro-location devices by use of individual mobile devices on the shoppers 101 and/or merchandises and corresponding data collection systems based on Bluetooth®, Wi-Fi®, near field communication (NFC), etc. (Bluetooth is a registered trademark of Bluetooth Special Interest Group in the United States and other countries; and Wi-Fi is a registered trademark of Wi-Fi Alliance in the United States and other countries.)

The shopping cart data 105 may include a number of items in one or more shopping cart of a shopper, types of items, etc., which may indicate how much time the shopper would need to check out the shopping cart. The shopper data 115 may include shopper identification, shopper micro-location in the store. In one embodiment of the present invention, the shopper data 115 may specify a progress in shopping of the shopper based on direction and speed of movement of the shopper such that the checkout operation optimizer 130 may estimate when the shopper would need checkout service.

The checkout operation optimizer 130 includes store status data 125, a checkout operation rule 135, a data aggregation process 140, a shopper data analyzer 150, shopper profiles 160, and store transaction records 170. Detailed operations of the checkout operation optimizer 130 are presented in FIG. 2 and corresponding description.

The data aggregation process 140 generates the store status data 125 by processing data collected throughout the store, including the shopping cart data 105 and the shopper data 115. Accordingly, the store status data 125 may include a number of shoppers in the store, respective shopper data for all shoppers in the store, a number of employees available for checkout lanes, etc. In one embodiment of the present invention, the data aggregation process 140 is implemented by IBM® MobileFirst™ Platform Presence Insights, which aggregates location and location-related metadata to build context that may be used for data analysis and resulting actions. (IBM is a registered trademark of International Business Machines Corporation in the United States and other countries; and IBM MobileFirst is a trademark of International Business Machines Corporation in the United States and other countries.)

The shopper data analyzer 150 looks up the shopper profiles 160, which stores shopping histories for respective shoppers, coupons available for each shopper, etc., for shoppers 101 as identified by use of the shopper data 115. The store transaction records 170 stores transaction records associated with checkout configurations and individual employee performances. In one embodiment of the present invention, employee performances are measured as an average length of time taken for checking one item out.

The checkout operation rule 135 specifies how many employees should be working in the store at a given time, how many checkout lanes should be operational at a given time, and a limit for waiting time for the shoppers 101 to check out their purchases. For example, one instance of the checkout operation rule 135 may specify that the store has at least ten (10) employees working in the store at any time during the business hours, that at least two (2) checkout registers are open at any time during the business hours, and that a shopper should be serviced within three (3) minutes of waiting at a checkout lane.

The checkout operation optimizer 130 produces an optimal checkout configuration 185 to one or more user for deployment. The user include a manager 191 who may manually direct one or more employees 199 to and from respective checkout lanes according to the optimal checkout configuration 185. Based on configuration of the same embodiment, or in another embodiment of the present invention, the checkout operation optimizer 130 may automatically push a direction to open/close a checkout register to each of the employees 199 according to the optimal checkout configuration 185.

The optimal checkout configuration 185 are generated based on the shopping cart data 105 and the shopper data 115 that are collected real-time during respective trips of each shopper 101, as well as the shopper profiles 160 and the store transaction records 170 that are recorded over time. Accordingly, the optimal checkout configuration 185 contributes to more efficient checkout operations of the store within the capacity, which lead to better shopping experiences and more customer satisfaction, and ultimately more customers, increased customer loyalty, and more sales and revenue without needing to hire more employees.

Figure 2:
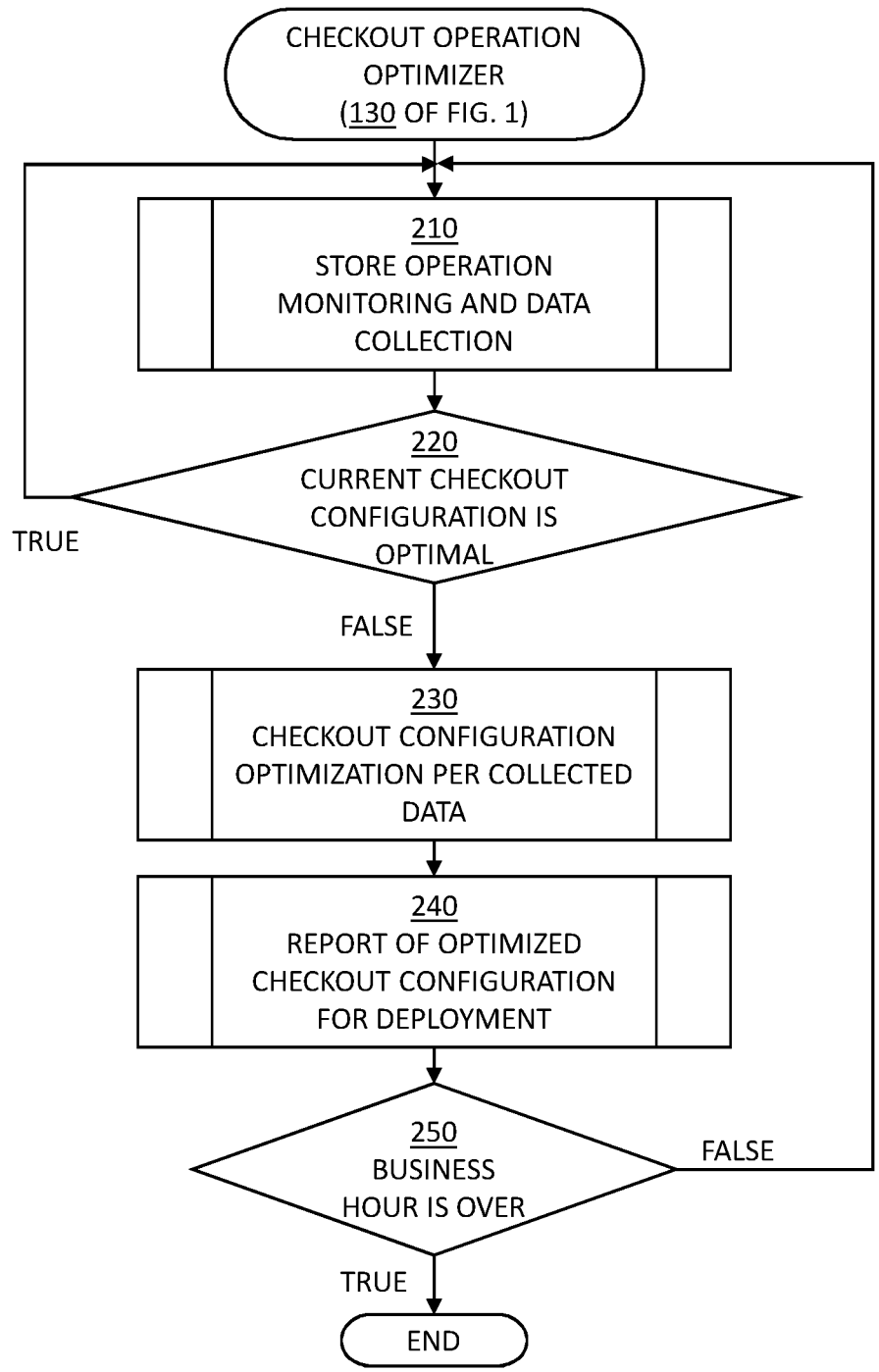
FIG. 2 depicts a flowchart performed by the checkout operation optimizer, in accordance with one or more embodiments set forth herein.

FIG. 2 depicts a flowchart performed by the checkout operation optimizer 130 of FIG. 1, in accordance with one or more embodiments set forth herein.

In block 210, the checkout operation optimizer 130 monitors store operations and collects data from the various monitoring devices. The checkout operation optimizer 130 aggregates all data, including the shopping cart data 105 and the shopper data 115, acquired from the monitoring devices including store-installed devices and individual mobile devices on the shoppers 101, and generates the store status data 125. Then the checkout operation optimizer 130 proceeds with block 220.

In block 220, the checkout operation optimizer 130 determines whether or not a current checkout configuration is optimal pursuant to the store status data 125, the checkout operation rule 135, the shopper profiles 160, and the store transaction records 170. If the checkout operation optimizer 130 determines that the current checkout configuration is optimal, then the checkout operation optimizer 130 loops back to block 210 for continued monitoring. If the checkout operation optimizer 130 determines that the current checkout configuration is not optimal, then the checkout operation optimizer 130 proceeds with block 230.

In one embodiment of the present invention, the checkout operation optimizer 130 selects store transaction records associated with respective store status data similar to the current store status data 125, compares the current checkout configuration with respective checkout configurations of the selected similar store transaction records. If the checkout operation optimizer 130 discovers that the current checkout configuration has a smaller number of open checkout registers than respective numbers of open checkout registers from the compared similar store transaction records, then the checkout operation optimizer 130 determines that the current checkout configuration is not optimal because the shoppers may need to wait longer than the maximum waiting time limits specified by the checkout operation rule 135. If the checkout operation optimizer 130 discovers that the current checkout configuration has a number of open checkout registers greater than or equal to respective numbers of open checkout registers from the compared similar store transaction records, then the checkout operation optimizer 130 determines that the current checkout configuration is optimal.

In block 230, the checkout operation optimizer 130 optimizes the current checkout configuration based on latest store status data 125 and the store transaction records 170 pursuant to the checkout operation rule 135. As noted, the checkout operation optimizer 130 keeps individual employee performance records in the store transaction records 170, and optimizes on a number of checkout registers. The checkout operation optimizer 130 may further specify a specific employee working on each checkout register based on their respective level of performance such as checkout speed. Examples of data that may be utilized in generating the optimal checkout configuration 125 may be, but are not limited to, the store status data 125 indicating how many shoppers are in the store, shopper micro-location data from the shopper data 115 where the shopper is in the store such as if the shopper is in the middle of shopping or if the shopper is approaching the checkout registers, the shopper profiles 160 indicating whether the shopper is of type that leisurely looks around or a grab-and-go shopper, a shopping history of each shopper, average length of visit of each shopper, and coupons available for each shopper, the shopping cart data 105 including respective numbers and kinds of items in each cart per shopper, and employee performance records such as individual check-out speed from the store transaction records 170. The data aggregation process 140 may further generate data as to a type of shoppers based on the shopping cart data 105, the shopper data 115, and the shopper profiles 160. The shopper micro-location data may be generated by use of various technologies such as Wi-Fi triangulation, face recognition based on images of the shopper as captured by in-store video cameras, tag identification and proximity detectors, etc.

For example, at 4:23 p.m., the store status data 125 indicates that there are ten (10) shoppers in the store and, according to the checkout operation rule 135, two checkout lanes are open. At 5:12 p.m., the store status data 125 indicates that there are fifty (50) shoppers in the store, and the checkout operation optimizer 130 updates the checkout configuration to service the shoppers within the maximum waiting time limits, as specified by the by checkout operation rule 135, by increasing the number of open checkout registers in a new optimal checkout configuration 185. At 6:02 p.m., the store status data 125 indicates that there are twelve (12) shoppers in the store, and the checkout operation optimizer 130 updates the checkout configuration by decreasing the number of open checkout registers in another new optimal checkout configuration 185. Also when increasing and decreasing the number of open checkout lanes, the checkout operation optimizer 130 may also take employee performances into account such that during busy hours, deploy more efficient employees as well as have more lanes open, and trainees may be deployed only during when current waiting time is far less than the maximum waiting time limits. Then the checkout operation optimizer 130 proceeds with block 240.

Figure 3:
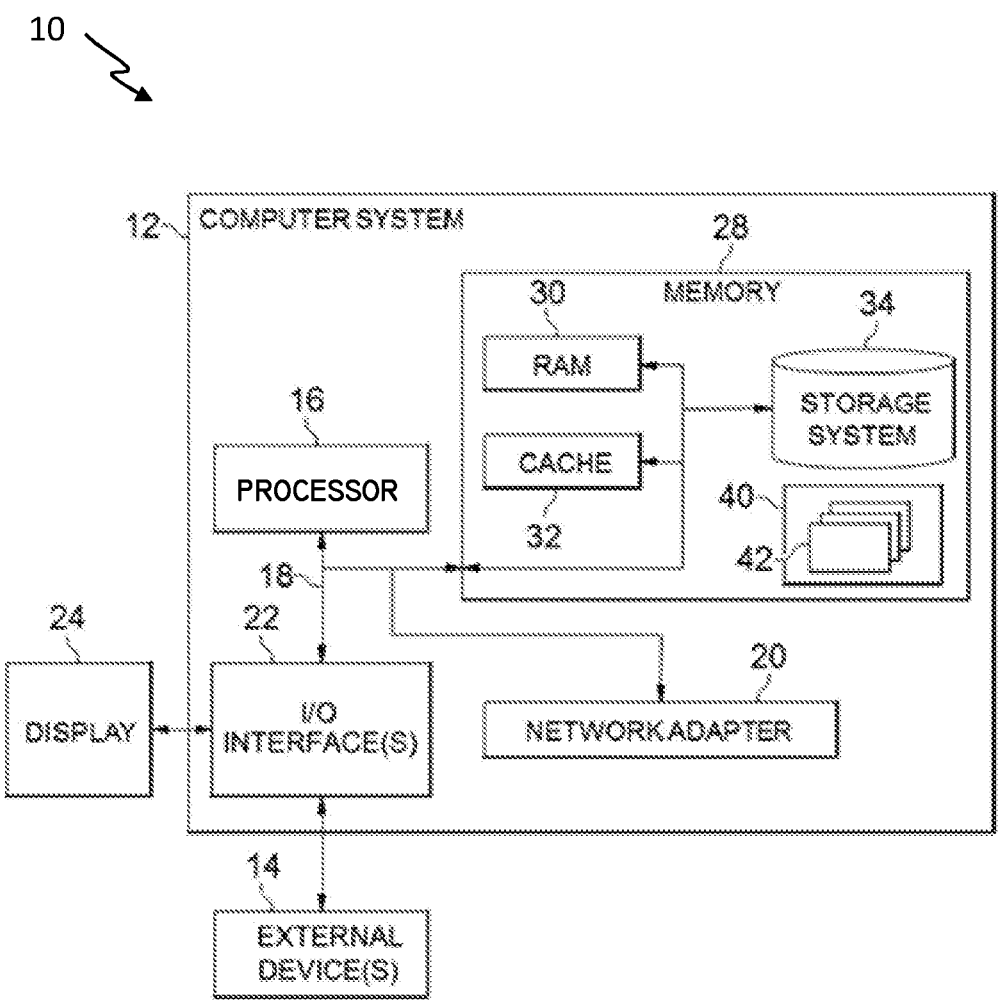
FIG. 3 depicts a cloud computing node according to an embodiment of the present invention.

In block 240, the checkout operation optimizer 130 reports the optimized checkout configuration resulting from block 230 to the users for deployment of the optimized checkout configuration, by use of numerous output and/or communication devices available to the checkout operation optimizer 130, as detailed in FIG. 3 and corresponding description. Then the checkout operation optimizer 130 proceeds with block 250.

In block 250, the checkout operation optimizer 130 determines whether the store is still open or closed. If the checkout operation optimizer 130 determines that the store is still open, then the checkout operation optimizer 130 loops back to block 210 for continued monitoring. If the checkout operation optimizer 130 determines that the store is closed, then the checkout operation optimizer 130 terminates processing.

Certain embodiments of the present invention may offer various technical computing advantages, including automated and optimized decision making on staff deployment at checkout registers in a store based on real-time data on shoppers, shopping carts, and store status as well as employee performance records and shopper profiles stores in a system. Certain embodiments of the present invention implement a selected range of mobile data collection and data aggregation processes such that the staff deployment may efficiently utilize human resources as well as satisfactorily service the shoppers as minimizing wait time at the checkout registers. Further, certain embodiments of the present invention offers personalized service for shoppers at the checkout by use of the shopper profiles as well as performance-based deployment of employees by use of the store transaction records.

Figure 4:
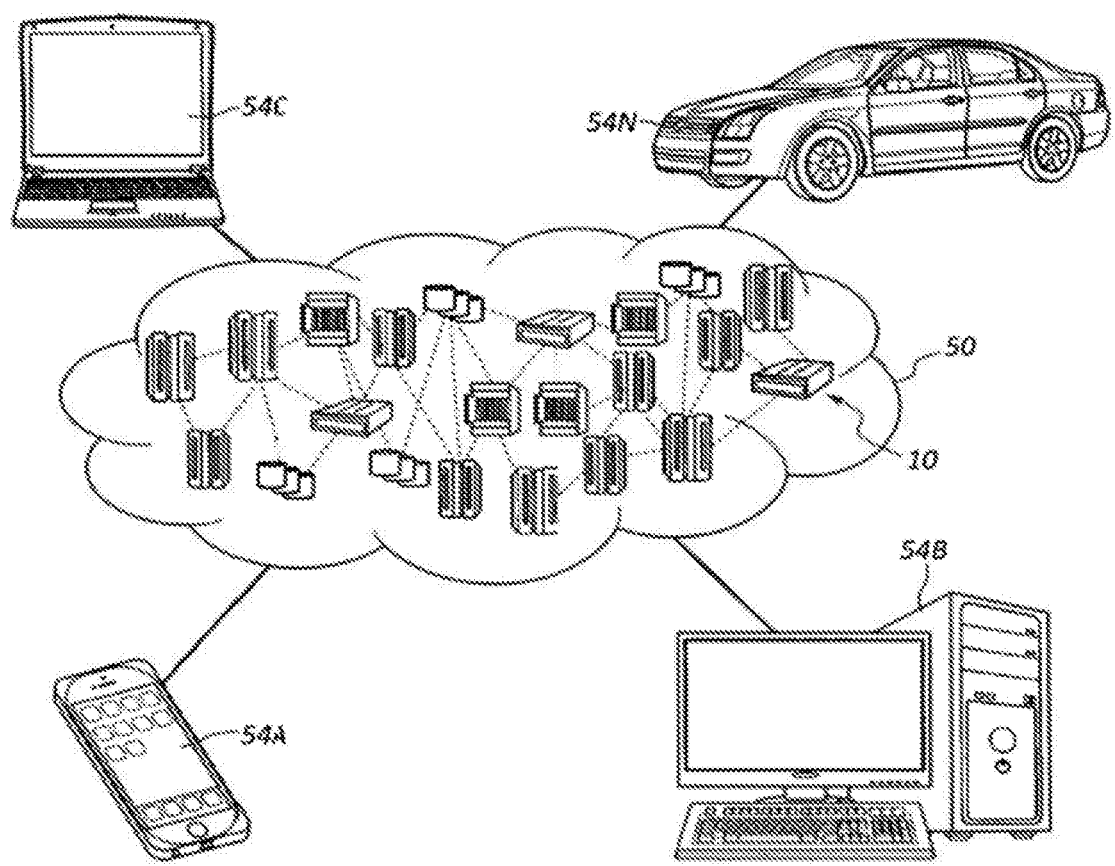
FIG. 4 depicts a cloud computing environment according to an embodiment of the present invention.
Figure 5:
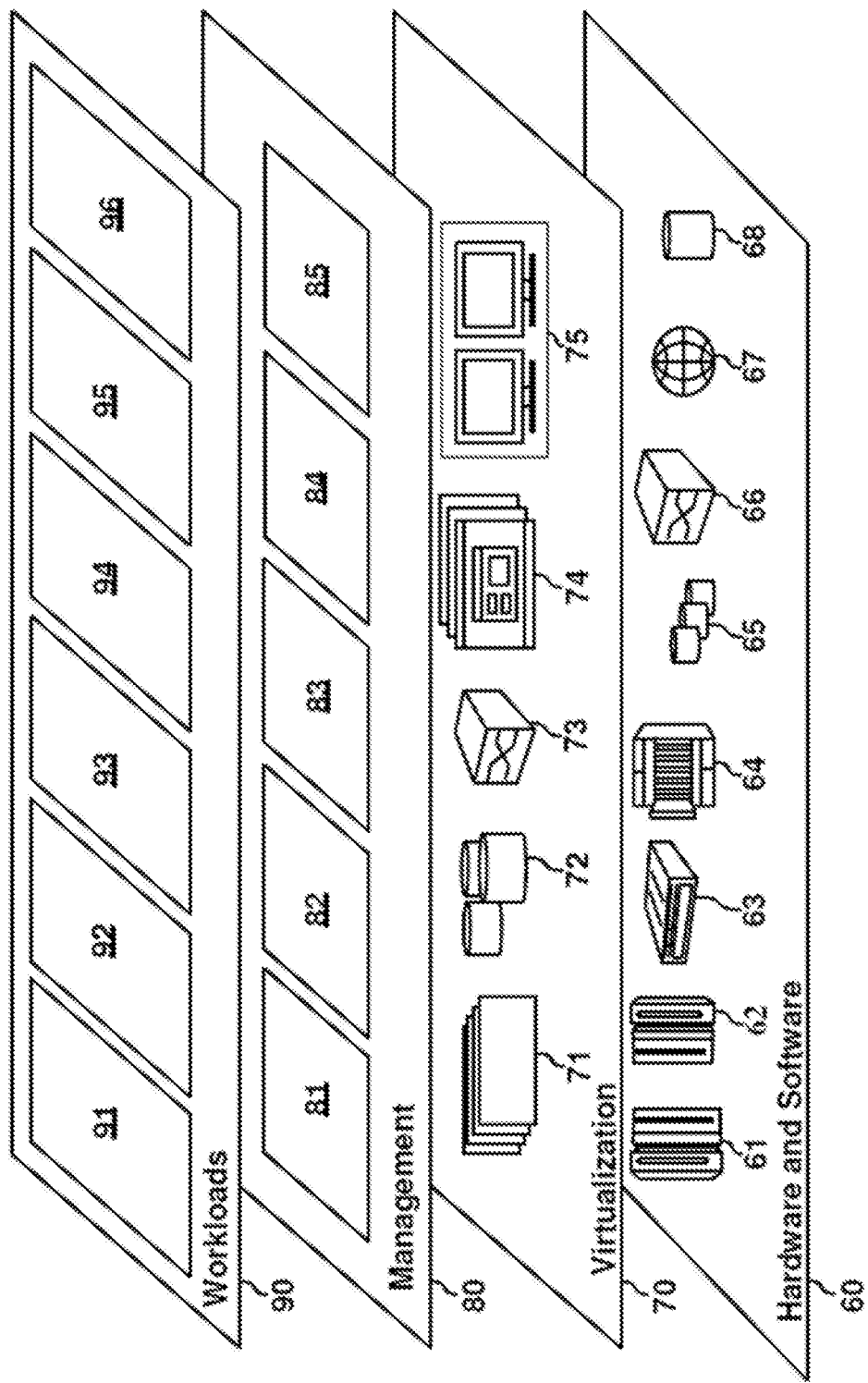
FIG. 5 depicts abstraction model layers according to an embodiment of the present invention.

FIGS. 3-5 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 3, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the checkout operation optimizer 130 of FIG. 1. Program processes 42, as in the checkout operation optimizer 130, the data aggregation process 140, and shopper data analyzer 150, of FIG. 1, respectively, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the checkout operation optimizer 96, as described herein. The processing components 96 can be understood as one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for optimizing checkout operation, comprising:

obtaining, by one or more processor of a computer, shopper data and shopping cart data associated with each of at least one shopper in a store, the obtaining comprising collecting the shopper data and the shopping cart data respectively associated with each of the shopper in the store, wherein the shopper data for each of the shopper includes a shopper identification and a micro-location in the store, wherein the shopping cart data includes a number of items in one or more shopping cart associated with each of the shopper and types of items, wherein the collecting is performed by one or more monitoring devices in the store selected from the group consisting of Wi-Fi triangulation, face recognition based on images of each of the shopper as captured by in-store video cameras, tag identification, and proximity detectors utilizing at least one of remote communication technologies selected from the group consisting of radio frequency identification, Bluetooth, Wi-Fi, and near field communication;

generating a current store status by use of the shopper data and the shopping cart data from the obtaining;

determining that a current checkout configuration is not optimal according to a checkout operation rule, based on store status data, a shopper profile respective to each of the at least one shopper, and one or more store transaction records;

creating a new checkout configuration by optimizing the current checkout configuration according to the checkout operation rule, by use of the store status data, each of the shopper profile, and the store transaction records; and communicating the new checkout configuration to one or more user at the store in order to deploy the new checkout configuration.

2. A computer implemented method for optimizing checkout operation, comprising:

obtaining, by one or more processor of a computer, shopper data and shopping cart data associated with each of at least one shopper in a store;

generating a current store status by use of the shopper data and the shopping cart data from the obtaining;

determining that a current checkout configuration is not optimal according to a checkout operation rule, based on store status data, a shopper profile respective to each of the at least one shopper, and one or more store transaction records;

creating a new checkout configuration by optimizing the current checkout configuration according to the checkout operation rule, by use of the store status data, each of the shopper profile, and the store transaction records; and communicating the new checkout configuration to one or more user at the store in order to deploy the new checkout configuration.

3. The computer implemented method of claim 2, the obtaining comprising:

collecting the shopper data and the shopping cart data respectively associated with each of the shopper in the store, wherein the shopper data for each of the shopper includes a shopper identification and a micro-location in the store, wherein the shopping cart data includes a number of items in one or more shopping cart associated with each of the shopper and types of items.

4. The computer implemented method of claim 2, the generating comprising:
aggregating all of the shopper data and the shopping cart data from the obtaining such that the current store status represents how many shoppers are in the store and how many checkout registers should be open according to the checkout operation rule, wherein the checkout operation rule dictates a maximum waiting time for each of the shopper at checkout registers in the store.

5. The computer implemented method of claim 2, the determining comprising:
selecting similar store transaction records associated with respective store status similar to the current store status from the generating;
comparing the current checkout configuration with respective checkout configurations of the similar store transaction records from the selecting; and
discovering that the current checkout configuration specifies a number of open checkout registers less than respective numbers of open checkout registers from the similar store transaction records.

6. The computer implemented method of claim 2, wherein the store transaction records include employee performances respective employee of the store, the employee performances being represented as respective average checkout processing time per item such that the employee performances are utilized in the creating the new checkout configuration.

7. The computer implemented method of claim 2, the generating comprising:
aggregating all of the shopper data and the shopping cart data from the obtaining into the current store status that represents how many shoppers are in the store and how many checkout registers should be open in order to comply with the checkout operation rule, wherein the checkout operation rule dictates a maximum waiting time permitted for each of the shopper at the checkout registers in the store.

8. The computer implemented method of claim 2, the determining comprising:
selecting store transaction records associated with respective store status similar to the current store status from the generating;
comparing the current checkout configuration with respective checkout configurations of the similar store transaction records from the selecting; and
discovering that the current checkout configuration specifies a number of open checkout registers less than respective numbers of open checkout registers from the similar store transaction records,
wherein the store transaction records include checkout configurations and employee performances respective employee of the store, wherein the employee performances are represented as respective average checkout processing time per item such that the employee performances are utilized in the creating the new checkout configuration, and wherein the shopping cart data, by use of a number of items in the one or more shopping cart of the shopper and the types of the items, indicate how much time the shopper would need to check out the one or more shopping cart.

9. The computer implemented method of claim 2, the determining comprising:
selecting store transaction records associated with respective store status similar to the current store status from the generating;
comparing the current checkout configuration with respective checkout configurations of the similar store transaction records from the selecting; and
discovering that the current checkout configuration specifies a number of open checkout registers less than respective numbers of open checkout registers from the similar store transaction records, wherein the store transaction records include checkout configurations and employee performances respective employee of the store, wherein the employee performances are represented as respective average checkout processing time per item such that the employee performances are utilized in the creating the new checkout configuration, and wherein the shopping cart data, by use of a number of items in the one or more shopping cart of the shopper and the types of the items, indicate how much time the shopper would need to check out the one or more shopping cart, and
the creating comprising:
combining the store status data relevant to the increase check-out speed for the store into the new checkout configuration, the store status data including how many shoppers are in the store, respective micro-location data for each shopper in the store from the shopper data with respect to how close the shopper is to check out the items, the shopper profiles indicating whether the shopper is of type that leisurely looks around or a grab-and-go shopper, shopping histories of each shopper, average length of visit of each shopper, and coupons available for each shopper, the shopping cart data including the respective numbers and types of items in each shopping cart for each shopper, and employee performance records specifying individual check-out speed from the store transaction records.

10. The computer implemented method of claim 2, wherein the store transaction records include employee performances respective employee of the store, the employee performances being represented as respective average checkout processing time per item such that the employee performances are utilized in the creating the new checkout configuration, the obtaining comprising collecting the shopper data and the shopping cart data respectively associated with each of the shopper in the store, wherein the shopper data for each of the shopper includes a shopper identification and a micro-location in the store, wherein the shopping cart data includes a number of items in one or more shopping cart associated with each of the shopper and types of items, wherein the collecting is performed using each of Wi-Fi triangulation for location detection, face recognition based on images of each of the shopper as captured by in-store video cameras, tag identification, and proximity detection, the proximity detection based on at least one of remote communication technology selected from the group consisting of radio frequency identification, Bluetooth, Wi-Fi, and near field communication.

11. The computer implemented method of claim 2, wherein the store transaction records include employee performances respective employee of the store, the employee performances being represented as respective average checkout processing time per item such that the employee performances are utilized in the creating the new checkout configuration, the obtaining comprising collecting the shopper data and the shopping cart data respectively associated with each of the shopper in the store, wherein the shopper data for each of the shopper includes a shopper identification and a micro-location in the store, wherein the shopping cart data includes a number of items in one or more shopping cart associated with each of the shopper and types of items, wherein the collecting is performed by one or more monitoring devices in the store selected from the group consisting of Wi-Fi triangulation, face recognition based on images of each of the shopper as captured by in-store video cameras, tag identification, and proximity detectors utilizing at least one of remote communication technologies selected from the group consisting of radio frequency identification, Bluetooth, Wi-Fi, and near field communication.

12. A computer program product comprising:
a computer readable storage medium readable by one or more processor and storing instructions for execution by the one or more processor for performing a method for optimizing checkout operation, comprising:
obtaining, by the one or more processor, shopper data and shopping cart data associated with each of at least one shopper in a store;
generating a current store status by use of the shopper data and the shopping cart data from the obtaining;
determining that a current checkout configuration is not optimal according to a checkout operation rule, based on store status data, a shopper profile respective to each of the at least one shopper, and one or more store transaction records;
creating a new checkout configuration by optimizing the current checkout configuration according to the checkout operation rule, by use of the store status data, each of the shopper profile, and the store transaction records; and
communicating the new checkout configuration to one or more user at the store in order to deploy the new checkout configuration.

13. The computer program product of claim 12, the obtaining comprising:
collecting the shopper data and the shopping cart data respectively associated with each of the shopper in the store, wherein the shopper data for each of the shopper includes a shopper identification and a micro-location in the store, wherein the shopping cart data includes a number of items in one or more shopping cart associated with each of the shopper and types of items.

14. The computer program product of claim 12, the generating comprising:
aggregating all of the shopper data and the shopping cart data from the obtaining such that the current store status represents how many shoppers are in the store and how many checkout registers should be open according to the checkout operation rule, wherein the checkout operation rule dictates a maximum waiting time for each of the shopper at the checkout registers in the store.

15. The computer program product of claim 12, the determining comprising:
selecting similar store transaction records associated with respective store status similar to the current store status from the generating;
comparing the current checkout configuration with respective checkout configurations of the similar store transaction records from the selecting; and
discovering that the current checkout configuration specifies a number of open checkout registers less than respective numbers of open checkout registers from the similar store transaction records.

16. The computer program product of claim 12, wherein the store transaction records include employee performances respective employee of the store, the employee performances being represented as respective average checkout processing time per item such that the employee performances are utilized in the creating the new checkout configuration.

* * * * *